(12) United States Patent
Mayer et al.

(10) Patent No.: US 10,919,231 B2
(45) Date of Patent: Feb. 16, 2021

(54) METHOD OF JOINING TWO OBJECTS

(71) Applicants: Woodwelding AG, Stansstad (CH);
Inter IKEA Systems B.V., Delft (NL)

(72) Inventors: Jörg Mayer, Niederlenz (CH); Mario Lehmann, Les Pommerats (CH); Laurent Torriani, Lamboing (CH)

(73) Assignees: WOODWELDING AG, Stansstad (CH); INTER IKEA SYSTEMS B.V., Delft (NL)

(*) Notice: Subject to any disclaimer, the term of this patent is extended or adjusted under 35 U.S.C. 154(b) by 694 days.

(21) Appl. No.: 15/313,267

(22) PCT Filed: May 28, 2015

(86) PCT No.: PCT/EP2015/061853
§ 371 (c)(1),
(2) Date: Nov. 22, 2016

(87) PCT Pub. No.: WO2015/181300
PCT Pub. Date: Dec. 3, 2015

(65) Prior Publication Data
US 2017/0144364 A1    May 25, 2017

(30) Foreign Application Priority Data

May 28, 2014   (CH) .................................. 00824/14

(51) Int. Cl.
*B29C 65/08* (2006.01)
*B29C 65/56* (2006.01)
(Continued)

(52) U.S. Cl.
CPC ............. *B29C 65/08* (2013.01); *B29C 65/48* (2013.01); *B29C 65/4815* (2013.01);
(Continued)

(58) Field of Classification Search
CPC ..... B29C 65/08; B29C 65/48; B29C 65/4815; B29C 65/5057; B29C 65/564;
(Continued)

(56) References Cited

U.S. PATENT DOCUMENTS 4,784,591 A   11/1988   Ackermann
5,879,115 A    3/1999   Medal
(Continued)

FOREIGN PATENT DOCUMENTS

CN     102536980    7/2012
FR      2 472 351    7/1981
(Continued)

OTHER PUBLICATIONS

English translation of Chinese Office Action dated Jul. 9, 2018, Application No. 201580036962.5, 9 pages.
(Continued)

*Primary Examiner* — Timothy Kennedy
*Assistant Examiner* — John Robitaille
(74) *Attorney, Agent, or Firm* — Rankin, Hill & Clark LLP

(57) ABSTRACT

A method for joining two objects by anchoring an insert portion provided on one of the objects in an opening provided on the other one of the objects. The anchorage is achieved by liquefaction of a thermoplastic material and interpenetration of the liquefied material and a penetrable material, the two materials being arranged on opposite surfaces of the insert portion and the wall of the opening. Before such liquefaction and interpenetration, an interference fit is established in which such opposite surfaces are pressed against each other, and, for the anchoring, mechanical vibration energy and possibly a shearing force are applied, wherein the shearing force puts a shear stress on the interference fit.

22 Claims, 8 Drawing Sheets

(51) Int. Cl.
  *B29C 65/60* (2006.01)
  *B29C 65/64* (2006.01)
  *B29C 65/00* (2006.01)
  *F16B 3/00* (2006.01)
  *B29C 65/50* (2006.01)
  *B29C 65/48* (2006.01)
  *B29C 65/78* (2006.01)
  *B29C 65/06* (2006.01)
  *B29K 309/08* (2006.01)
  *B29K 677/00* (2006.01)

(52) U.S. Cl.
  CPC ........ *B29C 65/5057* (2013.01); *B29C 65/564* (2013.01); *B29C 65/565* (2013.01); *B29C 65/604* (2013.01); *B29C 65/608* (2013.01); *B29C 65/645* (2013.01); *B29C 65/7841* (2013.01); *B29C 66/006* (2013.01); *B29C 66/02242* (2013.01); *B29C 66/1122* (2013.01); *B29C 66/1142* (2013.01); *B29C 66/126* (2013.01); *B29C 66/30221* (2013.01); *B29C 66/30223* (2013.01); *B29C 66/30321* (2013.01); *B29C 66/30326* (2013.01); *B29C 66/41* (2013.01); *B29C 66/43* (2013.01); *B29C 66/474* (2013.01); *B29C 66/727* (2013.01); *B29C 66/729* (2013.01); *B29C 66/7212* (2013.01); *B29C 66/7392* (2013.01); *B29C 66/7486* (2013.01); *B29C 66/7487* (2013.01); *B29C 66/81417* (2013.01); *B29C 66/81429* (2013.01); *B29C 66/8322* (2013.01); *B29C 66/9592* (2013.01); *F16B 3/005* (2013.01); *B29C 65/0618* (2013.01); *B29C 66/71* (2013.01); *B29K 2309/08* (2013.01); *B29K 2677/00* (2013.01); *B29K 2995/0046* (2013.01)

(58) Field of Classification Search
  CPC ... B29C 65/565; B29C 65/604; B29C 65/608; B29C 65/645; B29C 65/7841; B29C 66/006; B29C 66/02242; B29C 66/1122; B29C 66/1142; B29C 66/126; B29C 66/30221; B29C 66/30223; B29C 66/30321; B29C 66/30326; B29C 66/41; B29C 66/43; B29C 66/474; B29C 66/7212; B29C 66/727; B29C 66/729; B29C 66/7392; B29C 66/7486; B29C 66/7487; B29C 66/81417; B29C 66/81429; B29C 66/8322; B29C 66/9592; F16B 3/005

See application file for complete search history.

(56) References Cited

U.S. PATENT DOCUMENTS

| | | | |
|---|---|---|---|
| 8,528,299 | B2 | 9/2013 | Cove et al. |
| 9,388,835 | B2 | 7/2016 | Mayer et al. |
| 2008/0199249 | A1* | 8/2008 | Clinch .................. F16B 17/00 403/280 |

FOREIGN PATENT DOCUMENTS

| | | | |
|---|---|---|---|
| JP | 9/287609 | 11/1997 | |
| JP | 2008-138739 | 6/2008 | |
| JP | 2012-513552 | 6/2012 | |
| JP | 2016-503357 | 2/2016 | |
| WO | 96/01377 | 1/1996 | |
| WO | 98/042988 | 10/1998 | |
| WO | 2006/002569 | 1/2006 | |
| WO | 2008/080238 | 7/2008 | |
| WO | 2013/104422 | 7/2013 | |
| WO | WO-2014075200 A1 * | 5/2014 | ............ B29C 65/08 |

OTHER PUBLICATIONS

International Preliminary Report on Patentability dated Nov. 29, 2016, Application No. PCT/EP2015/061853.

* cited by examiner

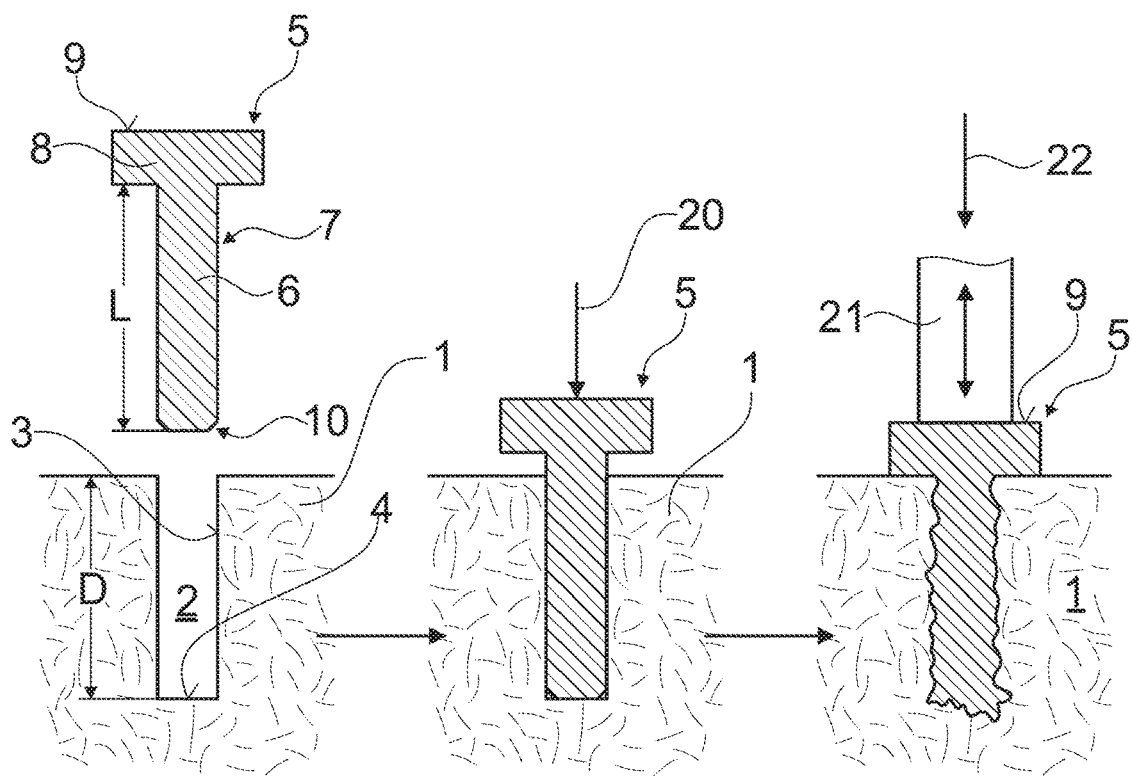
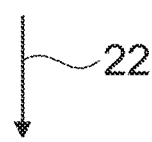
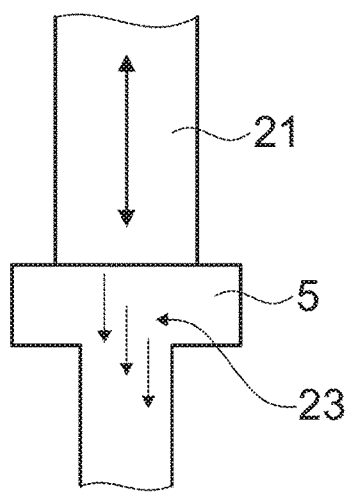
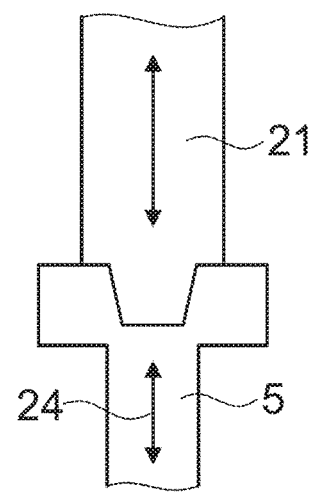
Fig. 2A  Fig. 2B

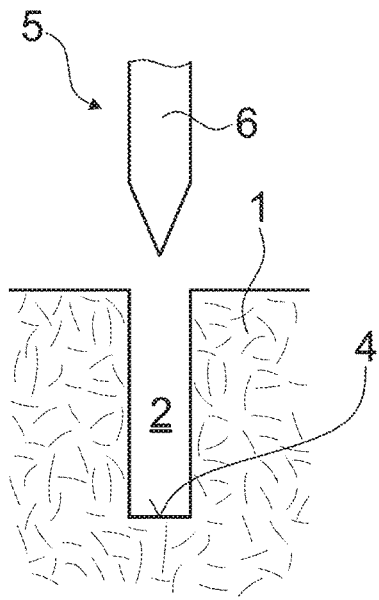 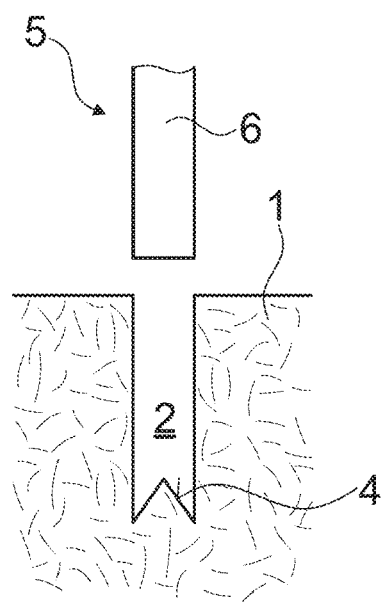
Fig. 3AFig. 3B
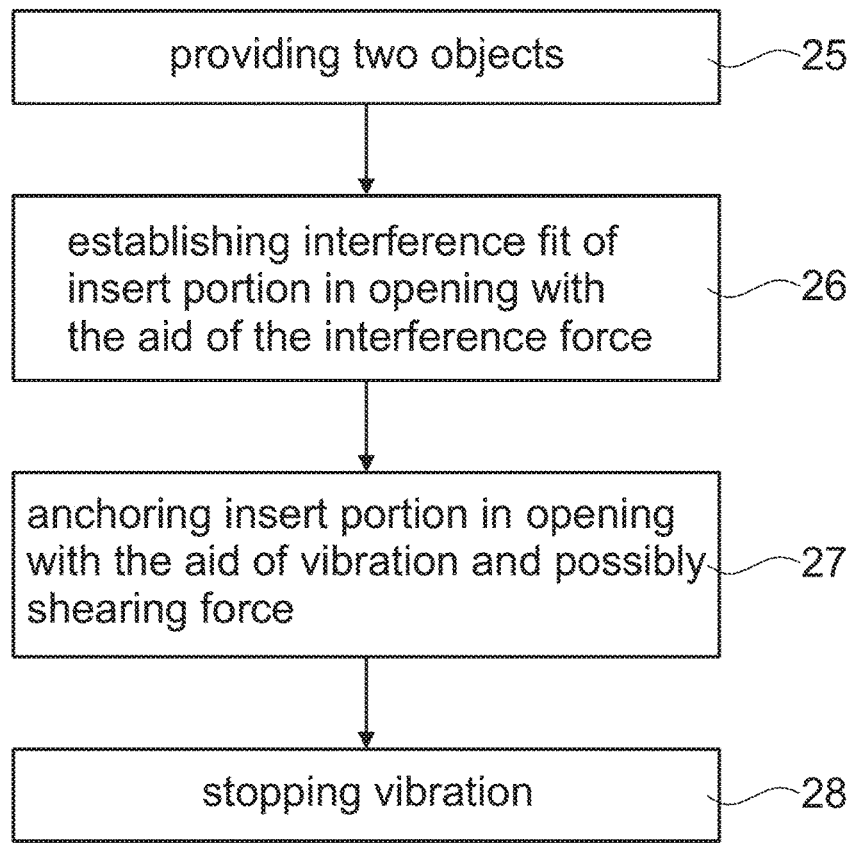
Fig. 4

METHOD OF JOINING TWO OBJECTS

BACKGROUND OF THE INVENTION

Field of the Invention

The invention is in the field of mechanical engineering and construction and concerns a method for joining two objects. One of the objects includes an insert portion and the other object includes an opening, and, for the two objects to be joined, the insert portion is anchored in the opening, wherein, in the anchoring area, one of the objects includes a solid material having thermoplastic properties, and the other object includes a solid material, which is penetrable by the material having thermoplastic properties when liquefied. The penetrable material is, e.g., fibrous or porous, it is, e.g., a structural foam.

Description of Related Art

From e.g. the publications WO 96/01377 (Createc), WO 98/042988 (Woodwelding) and WO 2006/002569 (Woodwelding) or WO 2008/080238 it is known to anchor inserts including materials having thermoplastic properties in fibrous or porous materials such as e.g. chipboard or wood. For such anchoring, the insert is positioned relative to the opening, and then mechanical vibration, in particular ultrasonic vibration, and a force directed for pressing the insert into the opening are simultaneously applied to the insert. In the step of positioning the insert, no relevant force is used, i.e., on application of the vibratory energy, the positioned insert will vibrate freely, or will, due to the named force pressing it against the fibrous or porous material, transmit the vibratory energy to the latter. In the step of applying vibration and force, the material having thermoplastic properties is liquefied due to friction heat at least where in contact with the fibrous or porous material and it penetrates into the fibrous or porous material of the walls of the opening and forms on re-solidification a positive fit connection with the porous or fibrous material.

According to the publication WO 96/01377, the insert and the blind opening in which the insert is to be anchored are adapted to each other such that the insert, on being positioned relative to the opening, does not reach the bottom of the opening. This is achieved by designing the insert and/or the opening to be tapering either continuously or step-wise. Simultaneously with the application of the ultrasonic vibration the insert is further advanced into the opening through the action of a pressing force, which results in liquefaction of the material having thermoplastic properties mainly on lateral insert sides. In a similar method a slightly oversized insert is positioned on the mouth of the opening and, under the action of the pressing force and the vibration, is advanced into the opening and laterally anchored therein. In both cases it is necessary to move the bulk of the insert in the direction of the depth of the opening during the application of the vibration.

According to the publications WO 98/042988 and WO 2006/002569, the insert and the blind opening in which the insert is to be anchored are adapted to each other such that the insert on being positioned in the opening sits on the bottom of the opening. During the application of the ultrasonic vibration, the insert is pressed against this bottom. This results in liquefaction of the material having thermoplastic properties in particular in the region of the distal insert end, i.e. in a substantially distal anchorage at the bottom of the opening but hardly any lateral anchoring, wherein the bulk of the insert is not or only very little moved during the application of the vibration.

U.S. Pat. No. 5,879,115 teaches a method and an apparatus for joining a plastic insert to a plastic base having a recess therein. The process relies on plastic material of both, the insert and the base to melt and to flow into spaces where the plastics of the insert and the base are melded together into a puddle to yield, after re-solidification, an integral joint (a weld). Applications of this approach are restricted to bonds between two objects that are both of thermoplastic material, the thermoplastic materials being capable of inter-mixing integrally with each other.

SUMMARY OF THE INVENTION

An object of the present invention is to provide an alternative method for joining two objects, wherein one of the objects includes an insert portion and the other one includes an opening, wherein, for the joining, the insert portion is anchored in the opening, and wherein, at least in areas in which such anchoring is desired, one of the objects includes a solid material having thermoplastic properties, and the other object includes a solid material, which is penetrable by the material having thermoplastic properties when liquefied.

A further object of the invention is to improve the above briefly described, known methods in which such joining is achieved with the aid of energy provided in the form of mechanical vibration, in particular ultrasonic vibration. Using the method according to the invention it is to be possible to achieve with the simplest design of insert and opening and within a minimum time of vibration application a particularly lateral anchorage of a very high uniformity even if the desired anchoring area is relatively large.

Generally speaking, the above named objects are achieved by establishing, in a first method step, an interference fit between the insert portion and the wall, in particular the lateral wall, of the opening in which the insert portion is to be anchored, and only then applying the energy which causes the liquefaction, which is such achieved mainly where the interference fit is active. The anchorage achieved with this method is of a similar strength (per anchorage area unit) as the anchorage achieved with the above briefly discussed method according to WO 96/01377, but it can be carried out without the necessity of moving the bulk of the insert portion over a relevant distance within the opening during the anchoring step, and this independent on the location in which anchorage is desired. This fact relevantly reduces the time necessary for achieving the anchorage. Furthermore, as liquefaction starts simultaneously in all locations in which anchoring is desired, the achieved anchorage is very homogeneous.

According to the invention, a first object including a first material and a second object including a second material are provided, wherein the first material is solid (at ambient temperature) and includes thermoplastic properties (i.e., it is liquefiable with the aid of thermal energy; in the following this material is called "thermoplastic material"), and the second material is also solid (at ambient temperature) and it is penetrable by the first material when the latter is in a liquefied state (i.e. the second material is fibrous or porous, it includes penetrable surface structures or it cannot resist such penetration under pressure). Especially, the second material is such that it does not become flowable under the conditions that apply when the first material penetrates the surface structures. For example, the second material may be of a material that does not have thermoplastic properties, i.e. a material different from a thermoplastic material. The second material may be such that it does not undergo a reversible liquefaction process, which means that it is of a material incapable of undergoing a reversible liquefaction process or of a material that has a melting temperature substantially above a temperature at which the first material becomes flowable. For example, if the second material is meltable, its melting temperature or glass transition temperature may be higher than a glass transition temperature or melting temperature of the first material by at least 50° C. or at least 80° C. or at least 100° C.

According examples of second materials are wood-based materials such as chipboard ("chipboard" in this text includes any composite materials manufactured by mixing wood particles of any shape with adhesives, independent of the product's shape, including for example oriented strand board), High Density Fiber board (HDF), Medium Density Fiber board (MDF), or wood, or metallic or ceramic foams or possibly open porous structures of a material based on a not thermoplastic (thermosetting) polymer.

Either one of the first and second object includes an opening and the other one includes an insert portion to be anchored in the opening, wherein the named materials constitute at least part of the surfaces of the insert portion and of the wall of the opening. The opening and the insert portion are dimensionally adapted to each other for an interference fit (press-fit), i.e. the insert portion is oversized at least locally compared with the opening, resulting in at least local pressure between insert portion and opening wall when the insert has a desired position within the opening, i.e. resulting in elastic compression of the insert portion and/or the wall of the opening. Therein the named first and second materials are arranged opposing each other at least in parts of areas of such compression.

Especially, the second object may include the opening and the first object may include the insert portion.

In a method step of establishing the interference fit, the insert portion is positioned in the desired position within the opening where it is retained by the above named interference fit. For achieving the interference fit, i.e. for generating the compression between insert portion and opening wall an interference force is necessary, either for forcing the insert portion into the undersized opening or for pressing wall sections of the opening against the insert portion. The magnitude of the interference force correlates substantially with the strength and area of the interference fit and it is mainly dependent on and limited by the relative dimensions of insert portion and opening and on the compressibility of either one or both of the two materials.

In an anchoring step being carried out after the step of establishing the interference fit, energy is applied to one or the other of the objects, wherein the energy is to act as heat in particular in areas (anchoring areas) in which, due to the interference fit, surface areas of insert portion and opening wall are pressed against each other and include one each of the thermoplastic and the penetrable material. The heat causes the thermoplastic material to liquefy and the pressure of the interference fit causes interpenetration of the two materials, wherein the interference fit is at least partly relaxed.

If the energy is applied as mechanical vibration (e.g. ultrasonic vibration), the interference fit is to be overcome, such that, at least in the named areas, the vibration causes friction and therewith friction heat between the insert portion and the wall of the opening. For overcoming the interference fit, it is necessary to apply a shearing load between the insert portion and the opening wall, wherein this shearing load may be caused by strong enough vibration of the one of insert portion or opening wall relative to the other one, or by the vibration and an additional shearing force acting between the two objects. For preventing undesired movement, in particular translational movement of the two objects relative to each other due to the shearing force, it may be necessary to counteract the latter in a suitable manner.

In a further method step the supply of energy is stopped until the thermoplastic material liquefied and dislocated in the anchoring step is re-solidified, whereby in the interpenetration area a sort of composite material is formed, which connects the two objects in a positive fit connection.

The energy necessary for liquefying the thermoplastic material in the anchoring step is supplied, as above discussed, to either one of the two objects preferably in the form of mechanical vibration, in particular ultrasonic vibration, to be transformed into friction heat at the interface between the insert portion and the wall of the opening. The vibration preferably has a main vibration direction parallel to the surfaces of insert portion and opening wall where the interference fit is active. Preferred therefore are, for achieving lateral anchorage, longitudinal vibrations substantially parallel to the depth of the opening or rotary vibrations with an axis substantially parallel to the depth of the opening. The above named additional shearing force, if applied, is preferably directed parallel to the main vibration direction, i.e. for the above named two cases it acts parallel to the depth of the opening or as torque with an axis parallel to the depth of the opening.

Other sorts of energy such as, e.g., irradiation with electromagnetic energy for which suitable absorbing means are to be provided at the locations where the interference fit is active, or corresponding heating (e.g. inductive or resistive heating) are applicable also.

As mentioned above, the thermoplastic material and the penetrable material taking part in the anchorage may be present only on selected surfaces of the insert portion and on walls of the opening. However they may also constitute larger portions of the two objects which may include further portions of different materials or may fully consist of either the thermoplastic material or the penetrable material.

In areas in which the interference fit acts either one of the two surfaces being pressed together may include structures functioning as energy directors, i.e. point-shaped or line-shaped elements protruding from a principal surface. These energy directing structures may or may not disrupt the opposite surface when the interference fit is established and need to be correspondingly taken into account when calculating the oversize of the insertion portion.

The penetrable material and the thermoplastic material need to have mechanical properties (under the conditions of the step for establishing the interference fit, i.e. usually at ambient temperatures) to be capable to stand the pressure of the interference fit. Creeping of either one of the two materials, which impairs the interference fit, is preferably to be prevented. This is achieved by selecting materials with substantially no creeping tendency at the temperature of the step of establishing the interference fit (amorphous polymers below their glass transition temperature or preferably at least 50° C. below their glass transition temperature and part crystalline polymers below their melting temperature) or by keeping a time interval between the step of establishing the interference fit and the step of anchoring short enough for starting the anchoring step before the interference fit is too much impaired by the creeping (the shorter the named time interval is, the more creeping tendency of either one of the materials can be tolerated, i.e. for polymers: the nearer the used temperature can be to the above given temperature limits). If the energy is applied in form of mechanical vibration, the penetrable material further needs to be capable to stand the vibratory friction of the anchoring step.

A penetrable material suitable for the method according to the invention is solid at least under the conditions of the method according to the invention (step of establishing the interference fit and anchoring step), wherein "solid" in the context of the present disclosure is to mean that this material is rigid, substantially not elastically flexible (no elastomer characteristics) and not plastically deformable and it is not or only very little elastically compressible. It further includes (actual or potential) spaces into which the liquefied material can flow or be pressed for the anchoring. It is e.g. fibrous or porous or includes penetrable surface structures, which are, e.g., manufactured by suitable machining or by coating (actual spaces for penetration). Alternatively the penetrable material is capable of developing such spaces under the hydrostatic pressure of the liquefied thermoplastic material, which means that it may not be penetrable or only to a very small degree when under ambient conditions. This property (having potential spaces for penetration) implies, e.g., inhomogeneity in terms of mechanical resistance. An example of a material that has this property is a porous material whose pores are filled with a material that can be forced out of the pores, a composite of a soft material and a hard material or a heterogeneous material (such as wood) in which the interfacial adhesion between the constituents is smaller than the force exerted by the penetrating liquefied material. Thus, in general, the penetrable material includes an inhomogeneity in terms of structure ("empty" spaces such as pores, cavities etc.) or in terms of material composition (displaceable material or separable materials).

For the method according to the invention to produce a suitably repeatable joining quality the penetrable material needs to have mechanical properties which are predictable and homogeneous enough for giving the interference fit a predicable strength. As this is hardly the case for living bone the method is not suitable for medical purposes.

In embodiments with an opening, for example a blind opening, into which the insert portion is inserted by introducing the insert portion in the opening the anvil object is subject to a considerable mechanical load due to the interference force. Depending to the composition of the penetrable material or possibly other materials of the anvil object, there may be a risk of cracks or other damages being caused by the introduction of the insert portion into the opening prior to the step of anchoring.

For example, in embodiments, the anvil object may include a board shaped portion (for example by being board shaped or by including a board shaped constituent), with broad surfaces and a narrow side face between the broad surfaces, with the opening extending from the narrow side face inwards (i.e., the opening has a mouth on the narrow side surface).

Generally, if necessary, measures may be taken for preventing cracks or other damages (bulging, or portions flaking off for example) from arising. Especially, measures for reducing the opposite surface areas that are subject to the interference force may be taken:

The cross sections of the insert portion and of the opening are adapted to each other by not having a same shape so that the interference fit is limited to only parts of the circumference of the cross sections.

If the distance between parts of subject to the interference force is similar to or smaller than a flow distance of the thermoplastic material during the subsequent anchoring step, then nevertheless the anchoring may concern the full circumference, with portions between the interference force portions serve as additional space where the squeezed thermoplastic material can go to. For example, if the cross section of the opening is round and the cross section of the insert portion is star shaped with closely spaced teeth, then the thermoplastic material during the anchoring may flow to fill spaces between the teeth.

If the distance between the interference force portions is large, then anchoring will be accordingly limited to parts of the circumference, essentially corresponding to the interference force portions.

In embodiments of this concept, edges of such cross sections may function as energy directing elements and/or may be pressed into the lateral wall of the opening on establishing the interference fit.

In addition or as an alternative, the cross section pairing of insert portion and opening may differ along the depth of the opening such that the interference fit is restricted to predetermined areas arranged along this depth. Especially, the interference fit may be restricted to areas at a distance from the mouth of the opening (to deeper portions) because the risk of cracks or other damages is the highest at the rim of the opening.

In examples, the opening may be stepped or tapered with a lower diameter at deeper positions, whereas the insert portion does not have any steps/taper or is stepped/tapered differently.

In addition or as yet another alternative, the insert portion may be provided with a hollow part, especially if it is of a, for example, slightly elastic material. In examples, the distal end may be hollow.

In addition or as a further alternative, the insert portion may be provided with stiff or flexible/soft wings. The insert portion may then, for example, be shot into the opening by air pressure or similar. The wings may ensure that the insert portion is located in a correct position without causing a cracking.

In addition or as an even further alternative, the interference force may be caused only immediately prior to the anchoring step and after the objects have been positioned relative to one another, from an inside of the first object. Especially, the first object may be provided with an interior opening accessible from the proximal side, and an expansion element may be pushed into the opening for example by the vibrating tool by which thereafter the energy is transferred to the first object. The expansion element in this has a larger cross section than the interior opening so that it expands the first object and thereby causes the interference force from inside.

Examples of penetrable materials applicable in the method according to the invention are solid materials such as wood, plywood, chipboard, cardboard, concrete brick material, porous glass, foams of metal, ceramic, or polymer materials, or sintered ceramic, glass or metal materials, wherein such materials include spaces into which the thermoplastic material can penetrate which spaces are originally filled with air or with another displaceable or compressible material. Further examples are composite materials that have the above stated properties or materials with surfaces including a suitable roughness, suitable machined surface structures or suitable surface coatings (e.g. consisting of particles). If the penetrable material has thermoplastic properties it is necessary that it maintains its mechanical strength during the anchoring step either by further including a mechanically stable phase or by having a considerably higher melting temperature than the thermoplastic material to be liquefied in the anchoring step.

A thermoplastic material suitable for the method according to the invention is, under the conditions of the step of establishing the interference fit, also solid in the sense as above described for the penetrable material. It preferably includes a polymeric phase (especially C, P, S or Si chain based) that transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than of the liquid phase. The thermoplastic material will generally include a polymeric component that is not cross-linked covalently or cross-linked in a manner that the cross-linking bonds open reversibly upon heating to or above a melting temperature range. The polymer material may further include a filler, e.g. fibers or particles of material that have no thermoplastic properties or have thermoplastic properties including a melting temperature range that is considerably higher than the melting temperature range of the basic polymer.

Examples for the thermoplastic material applicable in the method according to the invention are thermoplastic polymers, co-polymers or filled polymers, wherein the basic polymer or co-polymer is, e.g., polyethylene, polypropylene, polyamides (in particular Polyamide 12, Polyamide 11, Polyamide 6, or Polyamide 66), Polyoxymethylene, polycarbonateurethane, polycarbonates or polyester carbonates, acrylonitrile butadiene styrene (ABS), Acrylester-Styrol-Acrylnitril (ASA), Styrene-acrylonitrile, polyvinyl chloride, polystyrene, or Polyetherketone (PEEK), Polyetherimide (PEI), Polysulfon (PSU), Poly(p-phenylene sulfide) (PPS), Liquid crystall polymers (LCP) etc. LCPs are of particular interest since their sharp drop in viscosity during melting enables them to penetrate in very fine spaces in the penetrable material.

Usually either one of the two objects to be joined needs to be able to transfer the vibration energy, preferably with a minimum of energy loss, from a proximal object side, where a vibrating tool is applied, to a distal side, where the insert portion or the opening is arranged. If this object is fully made of the thermoplastic material the latter will need an elasticity coefficient (at ambient temperature) of at least 0.5.GPa or preferably of at least 1.0 GPa.

The thermoplastic material and the penetrable material need to be adapted to each other such that a suitable interference fit and the desired penetration are possible and result in a suitable anchorage. A material pairing, which has proved to be advantageous is, e.g., the pairing of plywood (penetrable material) and polyamid (thermoplastic material).

Mechanical vibration or oscillation suitable for the method according to the invention has preferably a frequency between 2 and 200 kHz (even more preferably between 10 and 100 kHz, or between 20 and 40 kHz) and a vibration energy of 0.2 to 20 W per square millimeter of active surface. The vibrating tool (e.g. sonotrode) is, e.g., designed such that its contact face oscillates predominantly in the direction of the tool axis (longitudinal vibration) and with an amplitude of between 1 and 100 μm, preferably around 30 to 60 μm. Such preferred vibrations are, e.g., produced by ultrasonic devices as known from ultrasonic welding.

In a preferred embodiment of the anchoring step of the method according to the invention one of the two objects (anvil object) is fixed in a stable position and the vibrating tool is applied to the other object (free object) and, if applicable, the vibrating tool is not only used for transmitting the vibration to the free object but also a shearing force being directed parallel to the depth of the opening. Therein the vibrating tool may not be connected to the free object or only loosely, i.e. it acts substantially as a hammer on the latter. Alternatively it may be fixed to the free object such that the vibration is fully transferred to the free object.

Undesired movement of the two objects relative to each other (or of the insert portion within the opening respectively) due to the shearing force directed parallel to the depth of the opening are limited or prevented by e.g. designing the opening as a blind opening or including a relevant cross section reduction, or by arranging an auxiliary anvil within or at the mouth of a through opening and by positioning the insert portion within the opening, in the step of achieving the interference fit, such that its distal end abuts the bottom of the blind opening, or the cross section reduction, or the auxiliary anvil or has a predetermined small distance from the latter.

In an exemplary preferred embodiment of the method according to the invention, the anvil object includes the opening (e.g., a blind bore, i.e., an opening with a constant circular cross section and a bottom) and it includes the penetrable material (e.g., it consists of wood or chipboard). The free object includes the insert portion (which is, e.g., pin-shaped) and it consists of the thermoplastic material (e.g. polyamide, PA 6.6). Anchorage is to be achieved mainly on lateral sides of the insert portion, but preferably also at the bottom of the bore. The insert portion has a cross section that is oversized relative to the opening by having a diameter being larger than the diameter of the bore. In the step of establishing the interference fit, the insert portion is forced into the bore until its distal end substantially contacts the bore bottom with the aid of the interference force, which is applied to the proximal end of the pin using any suitable tool, possibly the vibrating tool in a passive state (not vibrating). In the anchoring step the vibrating tool is activated and, if applicable, is simultaneously pressed against the proximal end of the free object with the additional shearing force.

In embodiments of this kind, axial movement of the bulk of the insert portion may be restricted to compensation of compression of the bottom of the opening and penetration of the penetrable material in the area of this bottom. The proximal end of the insert portion may move further due to shortening of the insert portion for compensating laterally displaced liquefied material.

The cylindrical insert portion may include energy directing features in form of axially extending ridges, which may or may not groove the lateral walls of the opening on establishing the interference fit. If the oversize of the pin cross section is smaller than the radial height of the ridges, the interference fit and therefore the anchorage will be restricted to the areas of the ridges and not concern the valleys between the ridges. Alternatively or in addition it is possible to equip the lateral walls of the opening with energy directing structures. The insert portion is preferably fully made of the thermoplastic material but alternatively may include a core that extends substantially along a central longitudinal axis of the insert portion and is made of a material (e.g., a metal or a ceramic material or a thermoplastic material with a considerably higher melting temperature than the thermoplastic material to be liquefied) preferably having a higher mechanical strength than the thermoplastic material.

Exemplary parameters for the above described preferred embodiment of the method according to the invention, in which for the anchoring step vibration as above described is used, are: (a) oversize of insert portion on lateral sides relative to lateral walls of opening: in the region of tenths of millimeters (e.g. 0.1 to 0.5 mm), (b) interference fit: in the region of tenths of N per mm$^2$ (e.g. 0.1 to 1 N/mm$^2$).

Experiments show that using the above briefly described preferred embodiment of the method according to the invention the anchoring step can be reduced to about half of the time needed if, according to the known method, the insert portion is forced into the opening simultaneously with the application of the vibration. This reduction in time constitutes a relevant saving of vibratory energy and a relevant advantage regarding an automated process. Furthermore, it puts less strain on a proximal face, on which the vibrating tool is hammering, and it reduces the risk of liquefied material being pressed out of the mouth of the opening. This increases the overall quality of the result of the method in that, even if the named proximal face is made of the thermoplastic material, it is not deformed or undesirably marked during the anchoring step and the region of the mouth of the opening is kept clean.

Exemplary alternatives to the above named preferred embodiment of the method according to the invention (as far as not already described further above) are, for example:

Insert portion and opening are not cylindrical but e.g. tapering either continuously or step-wise, wherein an overall tapering angle is preferably not larger than 10 to 15°.

Any cross section of the insert portion is paired with an opening in form of a groove, wherein a plurality of insert portions may be introduced into the groove either side by side or with distances therebetween.

The cross section of the insert portion and of the opening differ by the one including energy directing elements and the other one not.

The energy directing elements have the form of ridges extending parallel to the depth of the opening.

At a proximal end of the insert portion, a proximal portion is provided, wherein the proximal portion has, e.g., a larger cross section than the insert portion such that the proximal portion cannot be introduced into the opening. Such head-shaped proximal portion may serve for application of the vibrating tool and possibly for limiting movement of the insert portion into the opening during the step of establishing the interference fit and/or during the anchoring step. The proximal portion may in addition have further functions, for example associated with its shape.

If strong anchorage at the bottom of a blind opening is desired this distal end of the insert portion is tapering or includes energy directing surface structures.

If a minimum of anchorage at the bottom of a blind opening is desired the distal end of the insert portion is preferably blunt and/or does not include the thermoplastic material, and/or the bottom of the opening includes a material that is not penetrable or is less penetrable than the material of the lateral walls of the opening.

The insert portion includes a core extending, e.g., in a direction of the depth of the opening and consisting of a material that does not soften or liquefy under the conditions of the anchoring step (e.g. metallic or ceramic material or a polymer material that is a thermoset polymer or a thermoplastic polymer with a considerably higher melting temperature range than the thermoplastic material that is to be liquefied in the anchoring step). The core increases the mechanical strength of the insert portion.

These possibilities may be combined with each other in arbitrary combinations.

The invention also concerns a machine for carrying out the method in an automated manner. Such a machine includes in insertion means for inserting the insert portion in the opening to establish the interference fit, and an anchoring means for carrying out the anchoring process. The insertion means may be combined with the anchoring means (for example by a vibrating tool firstly pushing the insert portion into the opening and then being subject to mechanical vibrations to couple energy into the arrangement for the anchoring process) or may be separate therefrom.

The invention further concerns a set of a machine and a stock of first objects. If the machine further includes an opening manufacturing means (such as a drill), the opening manufacturing means and the first objects are adapted to each other so that the interference fit can be established by insertion of the insert portion in the opening.

BRIEF DESCRIPTION OF THE DRAWINGS

The invention is described in further detail in connection with the appended FIGS., wherein:

FIG. 1 illustrates the already above briefly discussed example of a preferred embodiment of the method according to the invention;

FIGS. 2A and 2b show two examples of vibration transfer from the vibrating tool to the free object;

FIGS. 3A and 3B show two examples for the pairing of distal end of the insert portion and bottom of the opening anchorage at the bottom of the opening in addition to the lateral anchorage;

FIG. 4 is a flow diagram of the method as illustrated in FIG. 1;

In the figures, same reference numbers refer to same or analogous elements.

DESCRIPTION OF THE PREFERRED EMBODIMENTS

Figure 5:
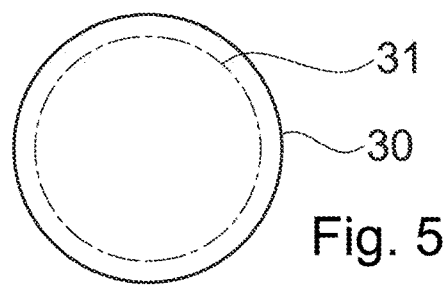
FIGS. 5 to 8 show examples of matched pairs of cross sections of insert portions and openings applicable e.g. in the method as illustrated in FIG. 1.

FIG. 1 illustrates the above already briefly described preferred embodiment of the method according to the invention, wherein the two objects, or the insert portion and the opening respectively, are shown in section parallel to a depth of the opening (longitudinal section). On the left hand side of FIG. 1 the two objects to be joined are illustrated.

The anvil object 1 includes the blind opening 2 having a depth D, a lateral wall 3, being substantially parallel to or forming an only small angle with the depth D, and a bottom 4, being e.g. substantially perpendicular to the depth D. The anvil object 1 further includes the penetrable material, which is arranged to constitute at least part of the lateral wall 3, e.g. the total of the lateral wall and in addition the bottom wall. Therein the anvil object 1 may be made fully of the penetrable material or may further include portions of other materials. The free object 5 includes a distally arranged insert portion 6 and it further includes the thermoplastic material, which constitutes at least part of the lateral surface 7 of the insert portion 6. Therein the free object 5 may be fully made of the thermoplastic material, as illustrated or only partly.

Insert portion 6 and opening 2 are adapted to each other in the above described manner (interfering cross sections, axial length of insert portion sufficient for enabling abutment of its distal end 10 on bottom 4). The free object 5 may further include a proximal portion 8 (e.g. shaped like a head), wherein a proximal face 9 thereof is equipped for applying tools used during the step of establishing the interference fit and during the anchoring step.

In the middle of FIG. 1 the two objects 1 and 5 are shown after establishment of the interference fit. The distal end 10 of the insertion portion 6, which is, e.g., blunt, abuts the bottom 4 of the opening 2 and the insert portion 6 is retained in the opening 2 by an interference fit, which acts mainly laterally (lateral surfaces of insert portion and lateral wall of opening are pressed against each other). For positioning the insert portion 6 in the opening 2 the interference force 20 is applied to the proximal face 9 of the free object 5 using any suitable tool (not illustrated). Alternatively, the interference fit can be established by providing the anvil object 1, e.g., in a plurality of sections which all include parts of the opening and by closing the sections around the insert portion 6, wherein the force by which the sections are moved against each other constitutes the interference force (see FIG. 20).

On the right hand side of FIG. 1 the two objects 1 and 5 are shown when joined, i.e. after the anchoring step. The free element 5 is anchored in the opening 2 in the area of its lateral surfaces 7 (or in the region of the lateral wall 3 of the opening 2 respectively) and in the region of the distal end 10 of the insert portion (or the bottom 4 of the opening 2 respectively). The anchoring step is carried out with the help of a vibrating tool 21, which is pressed against the proximal face 9 of the free object 5.

The length L of the insert portion 6 being originally greater than the depth D of the opening 2 allows movement of the free object 5 or its proximal portion 8 respectively against the anvil object 1 for compensating for the liquefied material, which is displaced during the anchoring step. At the latest when the proximal portion 8 abuts the surface of the anvil object 1 the anchoring step is to be terminated, unless further anchoring is desired between the distal face of the proximal portion 8 and the surface of the anvil object 1. Termination of the anchoring step can alternatively or in addition be determined by a predetermined time interval for the anchoring step or by a predetermined maximum value of the shearing force 22.

FIGS. 2A and 2B illustrate two alternatives for carrying out the anchoring step, which alternatives regard the interface between the vibrating tool and the proximal face of the free object as briefly mentioned already further above.

For the alternative as illustrated in FIG. 2A the vibrating tool 21 is only pressed against (not connected to) the proximal face of the free object 5 with the aid of the shearing force 22, wherein it is preferable to design the vibrating tool for maximal longitudinal vibration at its distal face. This means that only the one part of the vibration directed against the anvil object are transferred to the free object 5 (hammering effect, illustrated by a plurality of small arrows 23). If, with such an arrangement only lateral anchorage is to be achieved, care has to be taken, that there still is room at the bottom of the opening for a small displacement of the distal end of the insert portion and the shearing force 22 may be small. If anchorage also at the bottom of the opening is desired as illustrated in FIG. 1, the shearing force does not only help to overcome the interference fit for enabling the friction but it also serves the bottom anchorage as known from e.g. WO 98/042988.

For the alternative as illustrated in FIG. 2B, the vibrating tool 21 is rigidly connected to the free object 5, the connection being able to transmit the total vibration (double arrow 24) to the free object 5. If no anchorage at the bottom is desired, if the vibratory energy is large enough for overcoming the interference fit, and if the anvil object is sufficiently stably fixed or has a sufficient inertia, no additional shearing force is necessary for achieving lateral anchorage. Such method is in particular applicable when the opening is not a blind opening but a through tunnel. If the opening still includes a bottom and anchorage in this bottom in addition to the lateral anchorage is desired, a sufficient "shearing" force for such bottom anchorage is needed, which in addition may supplement the vibration for overcoming the interference fit.

FIGS. 3A and 3B illustrate two alternatives for achieving stronger bottom anchorage, wherein only the distal end of the insert portion 6 of the free object 5 and the opening 2 of the anvil object 1 are shown. According to FIG. 3A a tapering distal end 10 of the insert portion 6 is paired with a substantially flat bottom surface 4 of the opening 2. According to FIG. 3B a substantially blunt distal end 10 of the insert portion 6 is paired with an opening bottom 4 including a cone or similar shape having at least one elevation. While the alternative according to FIG. 3A favors interpenetration parallel to the depth of the opening, the alternative according to FIG. 3B favors lateral diversion of the liquefied material.

FIG. 4 is a flow diagram of the method according to the invention. This diagram shows that the method includes the following steps: step 25 of providing the two objects, step 26 of establishing the interference fit between the insert portion and the opening with the aid of the interference force, step 27 of anchoring the insert portion in the opening with the aid of mechanical vibratory energy and possibly the additional shearing force, and finally step 28 of stopping the vibration and of re-solidification of the material liquefied in the anchoring step. The time sequence of steps 25 to 28 is the illustrated one and cannot be altered. However, there may be pauses between step 25 and 26 and/or between steps 26 and 27, wherein, as mentioned further above, a pause between step 25 and 26 has to be carefully planned if either one of the thermoplastic and the penetrable material have creeping tendencies.

FIGS. 5 to 8 illustrate exemplary pairs of cross sections of insert portion and opening adapted to each other to be suitable at least for the preferred embodiment of the method according to the invention as illustrated in FIG. 1. Therein the cross section 30 of the insert portion is shown with a continuous line and is projected over the cross section 31 of the opening, which is shown with a broken line. The drawn cross sections 30 and 31 are the cross sections of the provided elements (before the steps of establishing the interference fit and before the anchoring step). The oversize of the insert portion is not drawn in scale (too large). For strictly cylindrical (circular or other cylinder) insert portions and openings the shown cross sections 30 and 31 will extend over most of the axial insert length and opening depth. For other forms of insert portions and/or openings the cross sections may change in form and/or size along the axial insert length and/or opening depth.

FIG. 5 shows two circular cross sections 30 and 31 with the required oversize of the cross section 30 of the insert portion. Such a cross section pairing will result in a uniform anchorage on the whole circumference of insert portion and opening provided that the penetrable material of the lateral opening wall is uniform in the areas of the interference fit.

Figure 6:
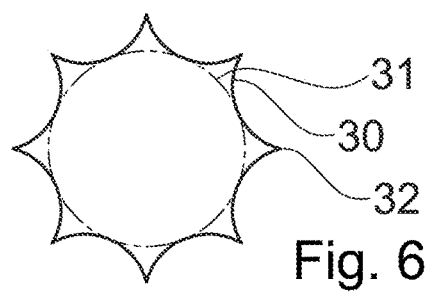

FIG. 6 shows a circular cross section 31 for the opening and a cross section 30 for the insert portion with a plurality of ribs 32. The ribs 32 serve as energy directing structures. If sufficiently sharp, the ribs 32 may penetrate the lateral wall of the opening on establishing the interference fit, which has to be taken into consideration when determining the interference of the cross sections. If only the ribs are oversized but not the valleys therebetween, anchorage will only occur in the vicinity of these ribs. Similar effects can be achieved by equipping the cross section 31 of the opening with points protruding from the opening wall while still keeping the cross section 30 of the insert portion substantially circular.

Figure 7:
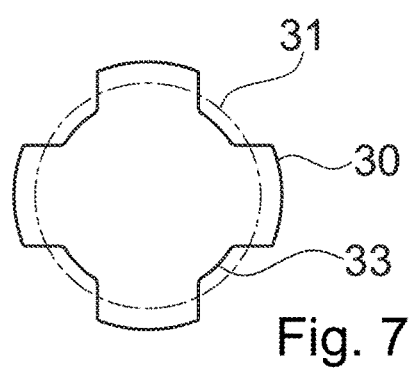

FIG. 7 shows a pairing of a circular cross section 31 for the opening and a cross section 30 for the insert portion, which has indentations 33 of a sufficient depth, such that in their area no interference fit will be established and therewith no anchorage will occur. Also in this case the indentations may be provided in the wall of the opening instead of in the insert portion.

Figure 8:
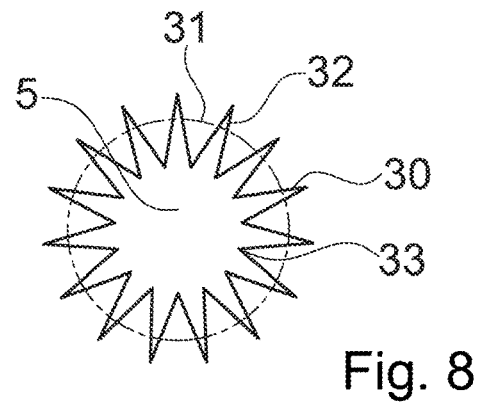

In the embodiment if FIG. 8, the insert portion in at least one depth has a star shaped cross section. The star-shaped cross section includes sharp edges 32 that like in the embodiments of FIGS. 6 and 7 may serve as energy directors. The depth of the indentations 33 between the edges is such that even if the edges cut into the penetrable material, there remains some space into which in the anchoring step some thermoplastic material may flow. This may especially be advantageous in case the penetrable material has a comparably low porosity.

In contrast to the embodiments of FIGS. 6 and 7, in the embodiment of FIG. 8 anchorage may occur along the full periphery of the insert portion.

Figure 9:
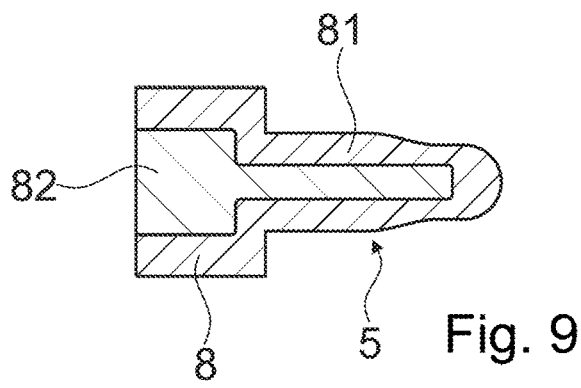
FIGS. 9 and 10 show examples of free objects with a not liquefiable core.

FIG. 9 depicts a free object 5 with a core 82 of a for example metallic material embedded in a thermoplastic coating 71.

Figure 10:
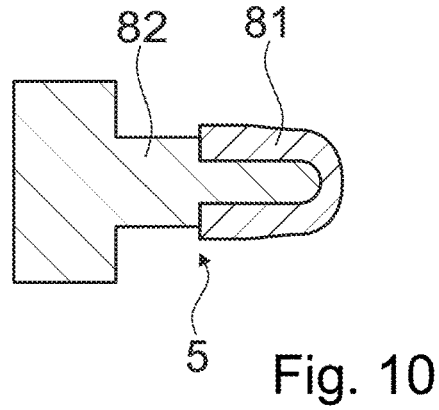

In embodiments with the object that includes the thermoplastic material further includes material that does not soften or liquefy under the conditions of the anchoring step, the thermoplastic material does not need to constitute the entire surface. Rather, it is sufficient if at least part of the surface area, loaded by the interference fit is constituted by the thermoplastic material. FIG. 10 shows an example where the thermoplastic material 81 is only present at the distal end. Alternatives with for example axially extending strips of the thermoplastic material are possible, too.

FIGS. 11 to 16 show pairings of insert portions and openings suitable for the method according to the invention, wherein the insert portions and openings are sectioned along the insert portion length or the opening depth respectively, and wherein again the section 35 of the insert portion is shown with a continuous line and is projected over the section 36 of the opening, which is drawn as broken line. Again the sections 35 and 36 are the sections of the elements as provided (i.e. before the step of achieving the interference fit and before the anchoring step).

Figure 11:
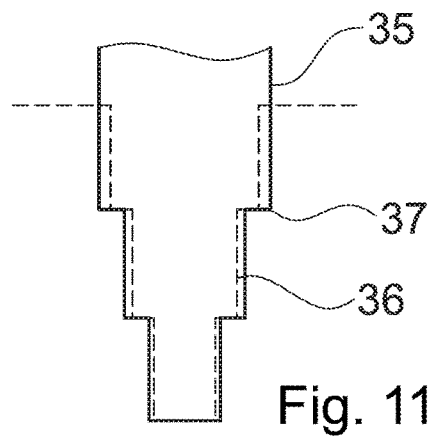
FIGS. 11 to 16 show examples of longitudinal sections of matched insert portions and openings applicable, e.g., in the method as illustrated in FIG. 1.

FIG. 11 shows a pairing of a tapering insert portion with a tapering opening, wherein the tapering is consists of a plurality of steps 37, wherein the steps on insert portion and opening have substantially the same axial lengths, and wherein the cross sections of insert portion and opening between steps are adapted to each other in substantially the same manner (similar oversize).

Figure 12:
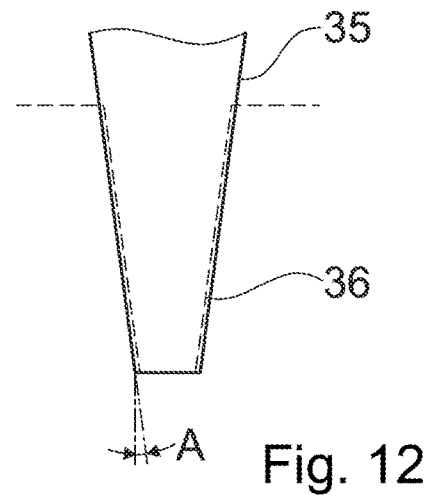

FIG. 12 shows a pairing of a tapering insert portion with a tapering opening, wherein the tapering in both cases is continuous and has an angle A relative to the insert portion length and the opening depth of not more than 10 to 15°. The cross sections of insert portion and opening over insert portion length and opening depth have preferably all similar forms but decreasing sizes.

Figure 13:
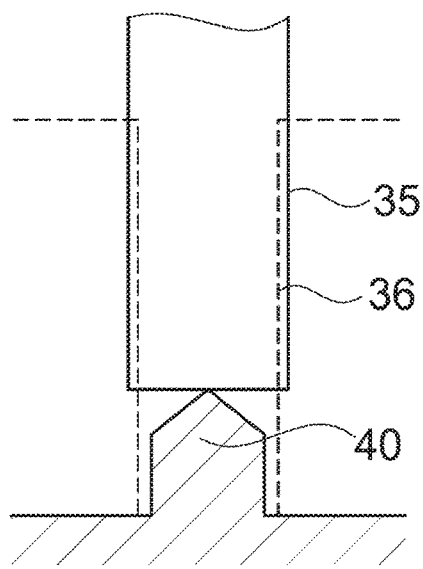

FIG. 13 illustrates the already further above discussed embodiment using an auxiliary anvil 40 positioned in a through opening and serving for counteracting the shearing force and possibly also the interference force. If the auxiliary anvil 40 is to be removed from the opening, care is to be taken when designing the anvil surface and the distal end of the insert portion that no connection between the two is effected in the anchoring step. Like the bore bottom of FIG. 3B, the auxiliary anvil may have a face directed towards the insert portion including an elevation, which may function as energy directing element for liquefaction at the distal end of the insert portion.

Figure 14:
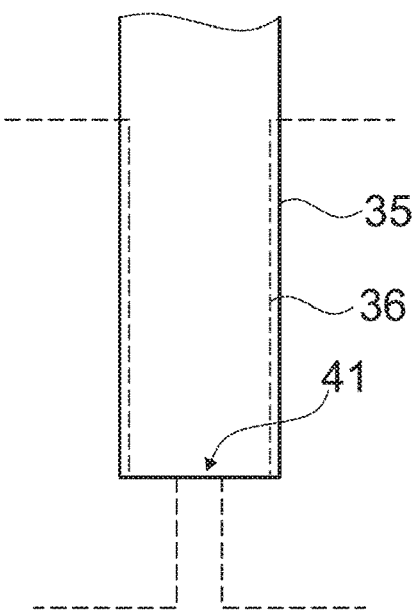

FIG. 14 illustrates the already further above discussed embodiment in which movement of the insert portion in the opening is limited by a step 41 in the opening where the cross section of the opening is reduced in such a manner that the distal end of the insert portion cannot be moved past the step neither under the influence of the interference force nor under the influence of the shearing force.

Figure 15:
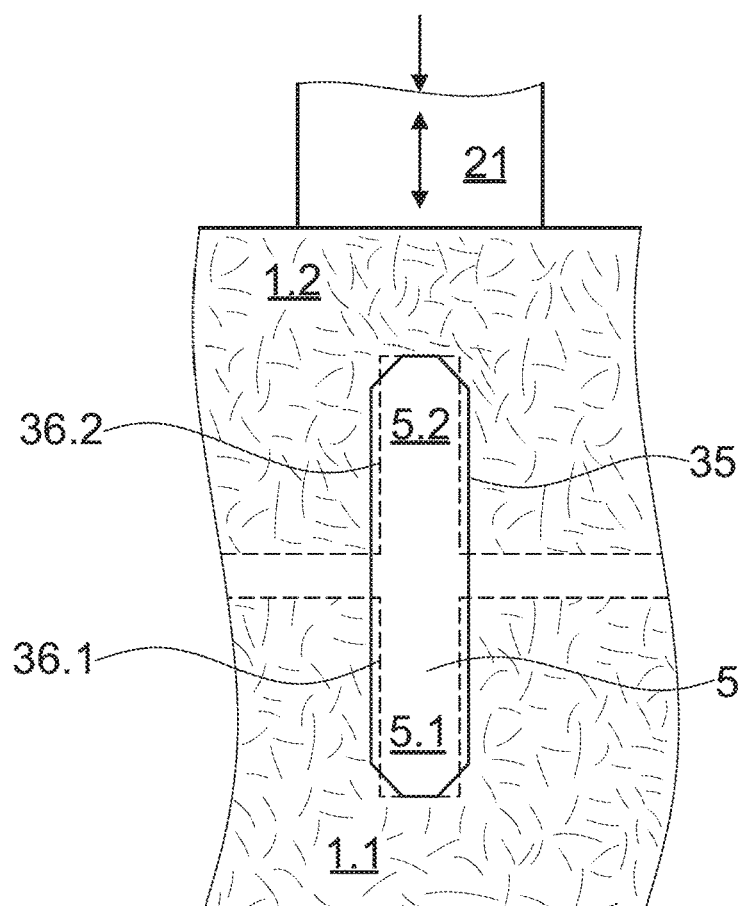

FIG. 15 illustrates a further exemplified embodiment of the method according to the invention wherein the object 5 including the insert portion and the thermoplastic material constitutes a sort of blind rivet. A distal portion 5.1. of the object 5 is to be anchored in an opening of a first object 1.1 including the penetrable material and a proximal portion 5.2 of the object 5 is to be anchored in an opening of a second object 1.2 including the penetrable material. Therein the interference force, the vibration and, if applicable, the shearing force are preferably applied to object 1.2 (free object) and object 1.1 is kept stable (anvil object) wherein object 5 functions as both free and anvil object.

Figure 16:
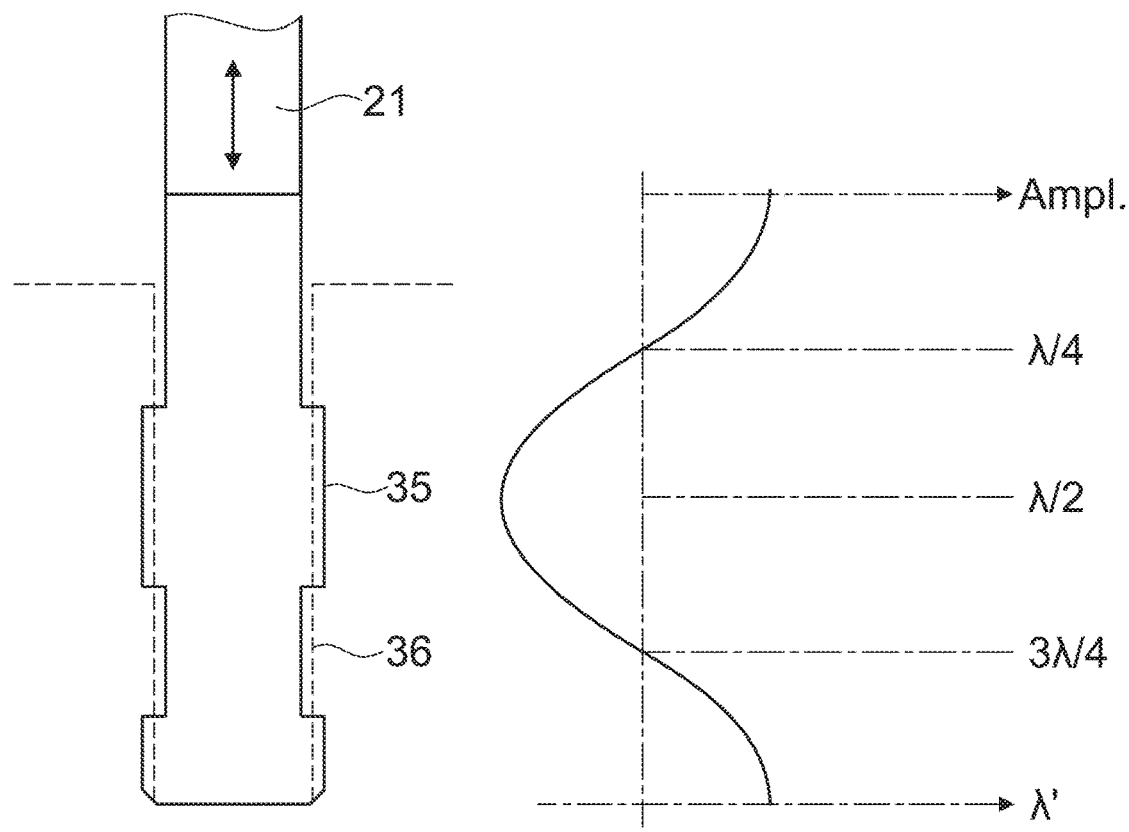

FIG. 16 illustrates a pairing of longitudinal sections 35 and 36 of insert portion and opening in which interference fit and anchorage are limited to predefined areas alternating with areas of no interference fit and anchorage along the longitudinal axis of the insertion portion or the opening depth respectively. This is achieved by cross sections of alternating sizes. The same effect can be achieved by pairing a cylindrical insert portion with an opening including portions of differing cross section sizes or vice versa. If the vibrating tool 21 is designed and energized for longitudinal vibration it is advantageous to arrange the above named areas of interference fit and anchorage at locations with large amplitude and the above named areas with no interference fit and no anchorage at locations with small amplitude. This means with maximum longitudinal amplitude at the distal face of the vibrating tool and the proximal face of the free object, that areas with interference fit and anchorage are preferably arranged at distances from the proximal face of n times λ/2 (n=integer) and areas of no interference fit and no anchorage therebetween (at distances of λ/4, 3λ/4, 5λ/4 etc.). This is shown in the diagram on the right hand side of FIG. 16.

Figure 17:
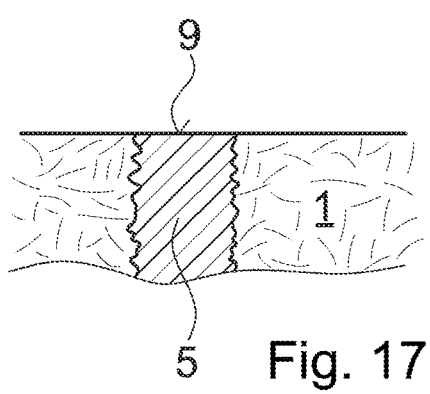
FIGS. 17 and 18 illustrate examples of proximal portions connected to insert portions anchored in an opening, e.g., in the method as illustrated in FIG. 1.
Figure 18:
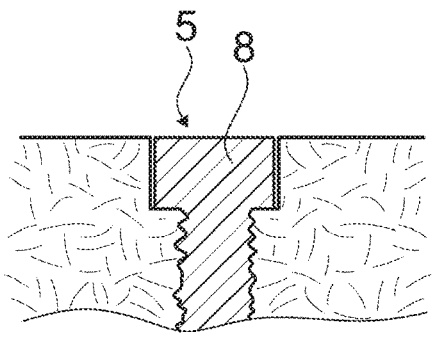

FIGS. 17 and 18 show further exemplary embodiments of proximal ends of insert portions anchored in openings, which are achievable with the method according to the invention and in particular with the preferred embodiment thereof as illustrated in FIG. 1. Both FIGS. 17 and 18 are partial sections parallel to the axial length of the insert portion or the opening respectively, wherein only a mouth region of the opening and a proximal portion of object 5 are shown.

FIG. 17 shows an object 5 with an insert portion only (no proximal portion), which is anchored in the opening with its proximal face 9 flush with the surface of the object 1 or in the mouth of the opening, respectively. This is achieved by dimensioning the object 5 with a length greater than the opening depth wherein the difference substantially corresponds with the expected shortening of object 5 during the anchoring step due to thermoplastic material penetrating the lateral and bottom wall of the opening. In the same manner, i.e. by corresponding difference between insert portion length and opening depth it is possible to achieve any desired position of the proximal face 9 relative to the mouth of the opening.

FIG. 18 shows a headed object 5, e.g. similar to the one shown in FIG. 1, wherein the head-shaped proximal portion 8 is countersunk in a corresponding enlargement of the opening cross section adjacent to the mouth of the opening.

Figure 19:
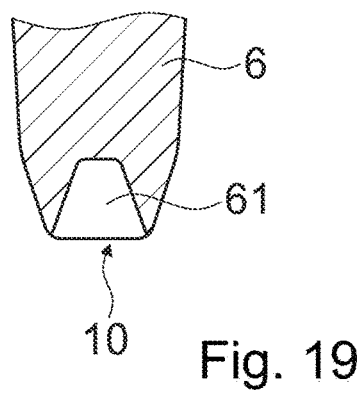
FIG. 19 illustrates an embodiment of an insert portion with a hollow distal end.

FIG. 19 illustrates an embodiment of an insert portion 6 with a hollow distal end. The distal end of the insert portion 6 is provided with a hollow space 61 so that the distal end 10 is somewhat flexible and provides less resistance to deformations when the insert portion is subject to a radial compression force, compared to an embodiment with a blunt distal end. Due to this, during introduction into the opening the interference force rises gradually instead of being particularly strong initially.

Figure 20:
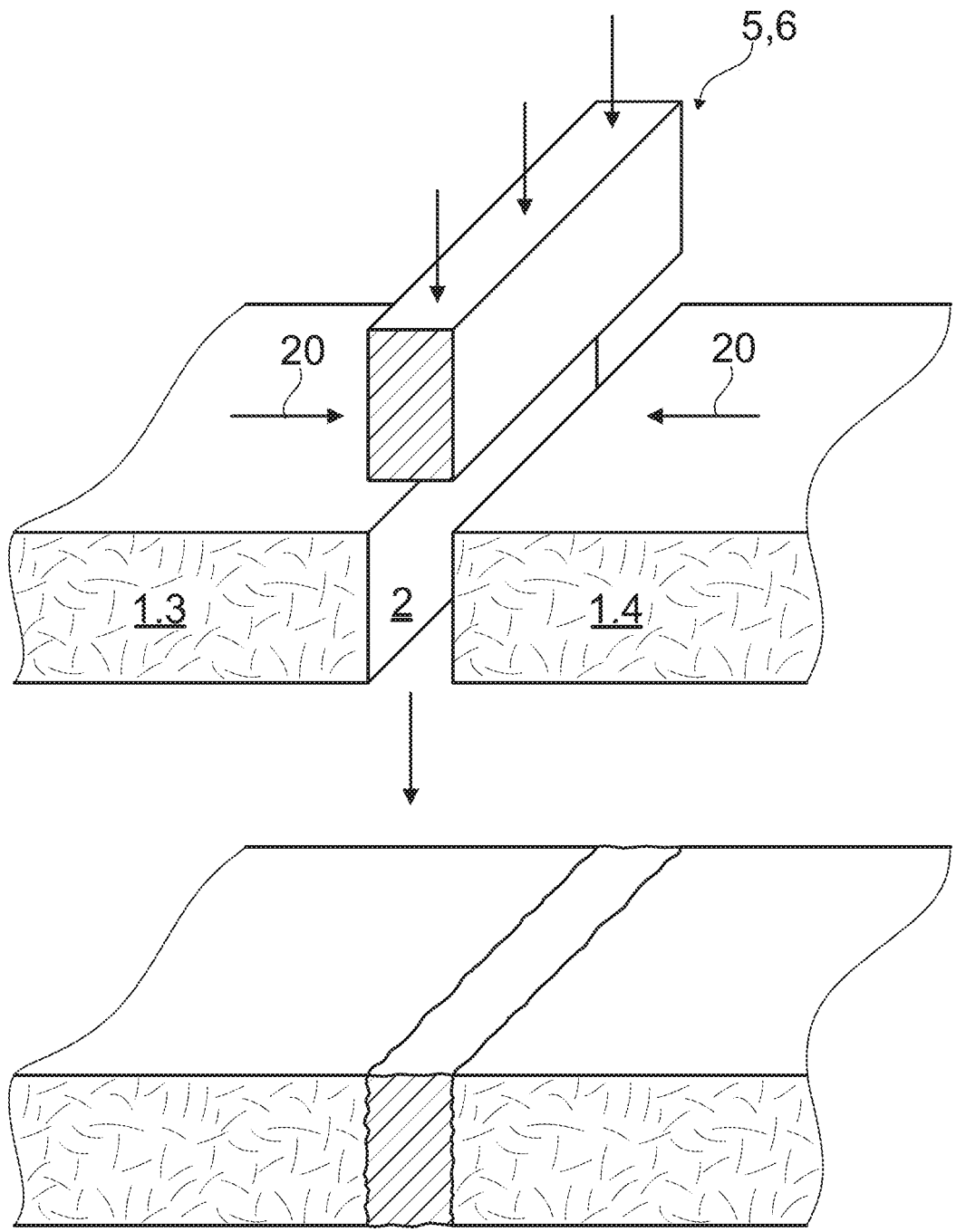
FIG. 20 illustrates an embodiment of the method according to the invention in which the interference fit is established by clamping wall parts of the opening around the insert portion.

FIG. 20 illustrates an embodiment of the method according to the invention in which, as mentioned already further above, the interference fit is established not by forcing the insert portion into the opening but by positioning the insert portion between wall parts of an opening and clamping the wall parts against the insert portion. In the illustrated exemplary embodiment the wall parts are constituted by narrow surfaces of boards (anvil objects 1.3 and 1.4), e.g. chipboards, which extend substantially parallel and which constitute between them the opening 2. The insert portion 6 has the form of a lath. In the step of establishing the interference fit, the insert portion is positioned and clamped between the wall parts wherein the anvil objects 1.3 and 1.4 are pressed against the free object 5 (interference force 20). FIG. 20 shows above the objects before the step of establishing the interference fit and below after the anchoring step.

Figure 21:
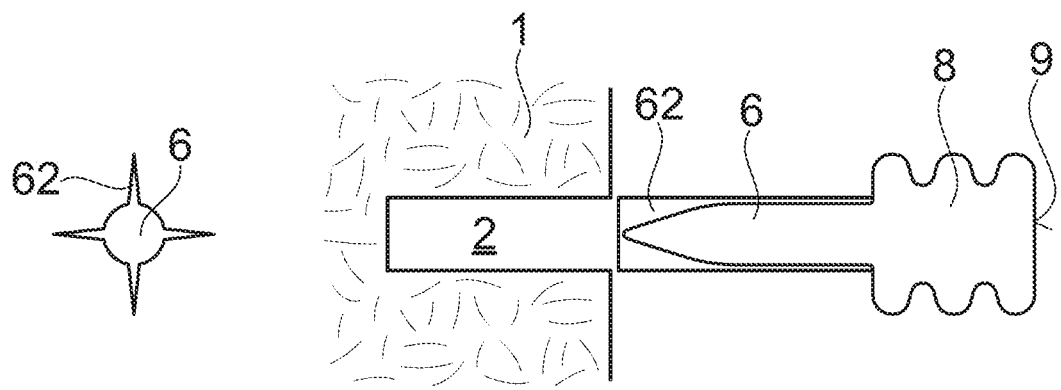
FIG. 21 shows an example of an embodiment with an insert portion with a plurality of wings.

In the embodiment of FIG. 21, the free object 5 has a plurality of wings 62 attached to the insert portion 6. The wings 62 may be comparably soft and thereby assist the location of the insert portion 6 in the correct position in the opening 2 without causing cracking in the anvil object 1. Especially, in embodiments, the cross section of the insert portion body (i.e. that part of the insert portion that is not constituted by the wings 62) may approximately correspond to the cross section of the opening 2 or be even slightly lower than the latter so that the interference force is only present at the location of the wings 62. This embodiment may be suited for especially weak or brittle penetrable material.

In a variant, the wings 62 may be dimensionally stable and serve as cutting blades. Also in this variant, the wings 62 may stabilize the insert portion during insertion.

Embodiments with the wings 62 are examples of embodiments that are particularly suited for processes in which the insert portion 6 is shot into the opening, for example comparable to an air gun like process.

Figure 22:
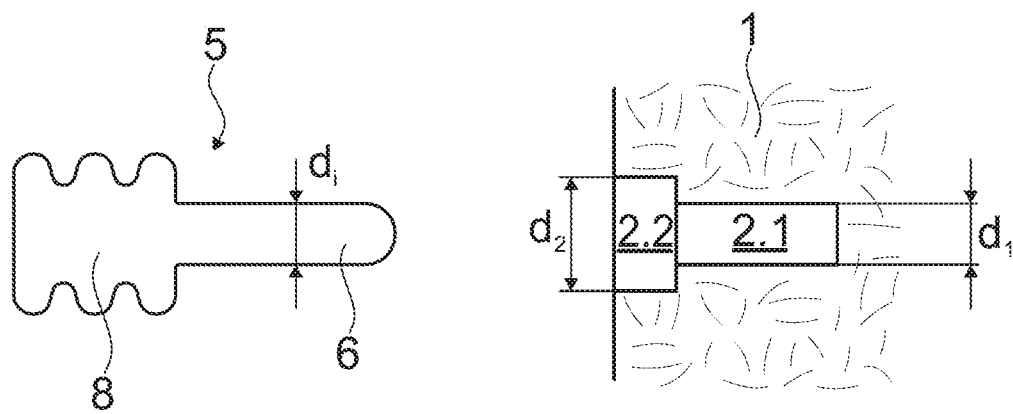
FIGS. 22 and 23 illustrate further examples of embodiments with a cross section pairing of insert portion and opening differing along the depth of the opening such that the interference fit is restricted to predetermined areas arranged along this depth.

FIG. 22 shows, further to FIG. 16, an example of an embodiment with a cross section pairing of insert portion and opening differing along the depth of the opening such that the interference fit is restricted to predetermined areas arranged along this depth. Especially, in the embodiment of FIG. 22 the interference fit is restricted to deeper sections thus minimizing the risk of cracks or other damages at the rim of the opening where the second object 1 is weakest, especially if it is board shaped and the opening extends from the narrow face.

To this end, the opening is stepped, whereas the insert portion is essentially cylindrical (with the possible exception of energy directors and/or a slight taper).

An opening having an inner (distal), smaller diameter section 2.1 and an outer (proximal) larger diameter section 2.2 may for example be manufactured by a dual drilling process, with two different drills. Also drills with a step feature are possible.

The cross section (diameter $d_1$ in the depicted embodiment assuming an approximately circular cross section) of the inner section 2.1 will be smaller than the cross section (diameter $d_i$) of the insert portion to generate the interference fit, whereas the cross section (diameter $d_2$) of the outer section 2.2 may approximately correspond to the diameter of the insert portion or may even be slightly larger.

Figure 23:
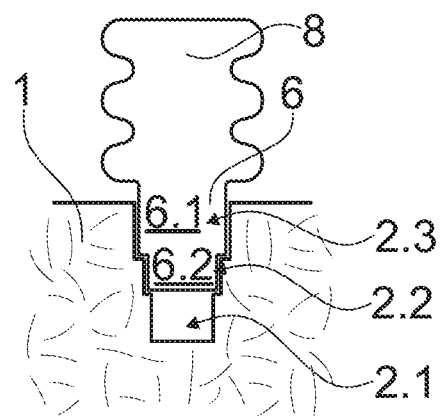

FIG. 23 illustrates a variant of the embodiment of FIG. 22 with multiple steps. The diameters of the respective sections are such that no interference fit is present in the depicted configuration where the insert portion is only partially inserted, and an interference fit will arise if the distal-most section 6.2 of the insert portion is pressed into the innermost portion 2.1 of the opening and the more proximal section 6.1 enters the middle section 2.2 of the opening but not within the proximal-most section 2.3 of the opening.

Figure 24:
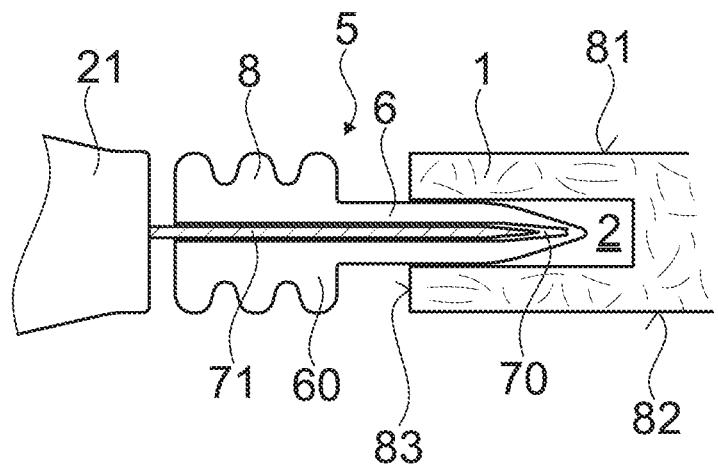
FIG. 24 shows an example of an embodiment in which the interference force is caused from an inside of the insert portion.

FIG. 24 shows a further embodiment. In this, the anvil object 1 is assumed to be a board having two broad surfaces 81, 82 a narrow side face 83, with the opening 2 in the narrow side face. In embodiments with a board shaped section of the anvil object, there is a particular risk of cracks generated upon introduction of the insert portion in the opening, or of portions flaking off).

The embodiment of FIG. 24 is an example of an embodiment in which the interference force is caused from an inside of the free object 5, starting, for example, only immediately prior to the anchoring step. To this end, the free object 5 is provided with an interior opening 70 into which an expansion element 71 is pushed, the expansion element having at least in some axial depths a cross section larger than a cross section of the interior opening. The insert portion 6 and the opening 2 may be adapted to each other so that no interference fit or an interference fit with only a small interference force is established when the insert portion 6 is in the opening 5 before the expansion element 71 is placed. The expansion element 71 may for example be introduced by a force exerted by the vibrating tool 21 (sonotrode) immediately prior to the step of causing the mechanical vibration to impinge on the free object by the vibrating tool 21.

A configuration with the anvil object having a board shaped section and with the opening extending from the narrow side face is applicable to all embodiments described in this text. Applications include the furniture industry, where a head portion 8 of the free object 5 may serve male part of a joint co-operating a female parts of a second furniture part, for example as described in as WO 2013/104422 by Inter Ikea Systems B.V.

Figure 25:
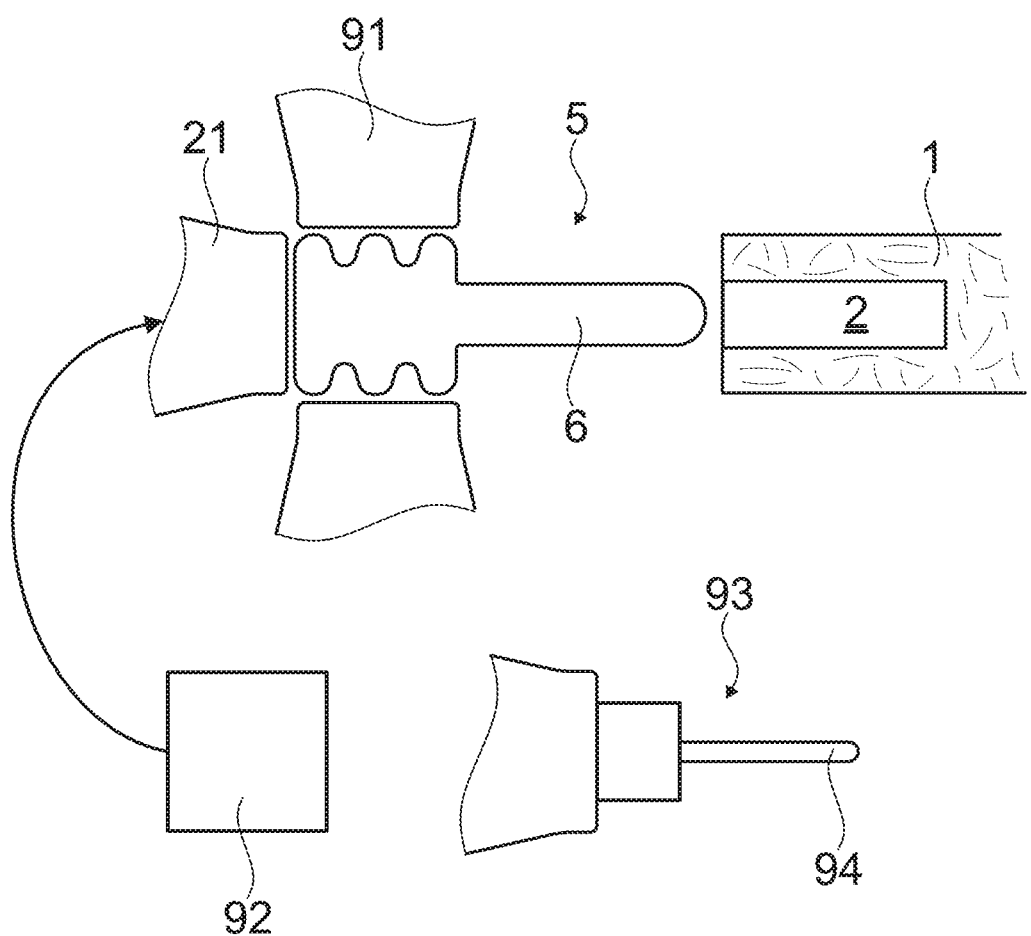
FIG. 25 schematically depicts a machine for carrying out a process as described herein.

FIG. 25 yet schematically illustrates elements of a machine for carrying out the method described herein in an automated manner. The machine includes, in addition to the vibrating tool 21, a gripping arrangement 91 for positioning the free object 5 relative to the anvil object 1 prior to the step of establishing the interference fit and also, at least in part, during this step. For establishing the interference fit, the vibrating tool 21, prior to being subject to the vibrations, may be used, for example by pressing the insert portion into the opening. Alternatively, the machine may include a separate insertion station, where the interference fit is established by a corresponding insertion tool, for example a pusher tool.

The vibrating tool is connected to a vibration source 92, such as a piezoelectric transducer, that causes the vibrating tool to vibrate.

The machine may optionally further include an opening producing device, such as a drilling device 93, including a drill 94 the diameter of which is adapted to an outer diameter of the insert portion 6 in a manner that when the insert portion is inserted in the opening the interference fit is established, i.e. the drill 94 is configured to form an opening with a diameter somewhat less than an outer diameter of the insert portion.

The machine may be an automated machine for mass production, including several stations and transport means for conveying the anvil object from station to station. For example, the machine may include an opening forming (drillings) station, an insertion station, and an anchoring station, as well as means for conveying anvil objects from station to station in a cycled manner. A machine may include further stations, such as a cutting-to-size station, arranged before the opening forming station. In addition or as an alternative, it may include storages for unprocessed anvil objects, processed anvil objects (to which the objects are conveyed after the method has been carried out) and/or for free objects.

EXAMPLE

An anchoring device of polyamide (PA 6.6 filled with 15% of glass fibers) was joined to a porous structural foam of a density in the range of 0.5 to 0.8 g/cm$^3$, using the method as illustrated in FIG. 1. The opening provided in the foam was a blind bore. The inserted portion of the device was cylindrical, had a circular cross section (no energy directing structures) with a diameter being 3% oversized to create the interference fit, an overlength of 25% with respect to the bore depth, and a blunt distal end. The device was forced into the opening which necessitated an interference force of about 10 MPa related to the device cross section. In the inserted position the distal end of the device abutted the bottom of the blind bore. For the anchoring step, the foam was locally fixed (anvil object) and ultrasonic vibration was coupled into the proximal face of the device (free object) and simultaneously the pin was pressed against the bottom of the opening with a shearing force of about twice the interference force, using a stationary ultrasonic device by Branson (Series 2000). Therein the device was not attached to the sonotrode of the ultrasonic device. The anchoring step was carried out with a vibration frequency of about 20 kHz and a longitudinal amplitude at the distal end of the sonotrode in the range of 50 to 90 µm. After about 0.3 sec of anchoring time the device was fully seated in the foam and the vibration was stopped.

The overlength of the device was consumed by displacement of the thermoplastic material into the bottom of the opening, and possibly also by an increase of the depth of the opening due to either the interference force or the shearing force, and further by radial displacement of the thermoplastic material. The anchorage on the lateral sides of the device was very uniform all around the device and in particular along its length. For removing the device from the foam a force had to be applied which was about twice the force needed for removal of an identical device anchored with a similar method in a non-undersized bore (no lateral interference fit and therefore hardly any lateral anchorage). This allows the conclusion that the lateral anchorage induced by the lateral interference fit contributes about the same amount of retention strength as the anchorage at the bottom of the bore.

If a similar device is anchored in a similar opening using the same equipment but applying the vibration already during the forcing of the pin into the opening, the bulk of the device needs to be moved during the anchoring step for the full opening depth, which at least doubles the time needed for the anchoring step.

What is claimed is:

1. A method of joining a first and a second object, the method comprising the steps of:
   providing the first object comprising a first material and the second object comprising a second material, wherein the first material is solid and comprises thermoplastic properties and wherein the second material is solid and is penetrable by the first material when in a liquefied state, the second object further comprising an opening having a depth and the first object further comprising an insert portion having a length and a proximal portion proximally of the insert portion, wherein the opening, the proximal portion and the insert portion are adapted to each other for the insert portion to be positioned in the opening with an interference fit, and for the proximal portion not to be able to be introduced into the opening, and wherein said first and second materials constitute at least part of opposite surface areas of insert portion and opening pressed against each other in the interference fit,
   establishing the interference fit by placing the insert portion in the opening and applying an interference force between the opposite surface areas of the insert portion and the opening;
   after establishing the interference fit, anchoring the insert portion in the opening by transferring energy suitable for liquefaction of the first material to the vicinity of said opposite surface areas in an amount and for a time sufficient, for liquefaction of a flow portion of the first material, the flow portion of the first material being material of the insert portion, and interpenetration of the second material by the flow portion in a vicinity of said opposite surface areas;

stopping the transfer of energy for a time sufficient for the first material liquefied during the step of anchoring to re-solidify and thereby establish anchoring of the insert portion in the opening.

2. The method according to claim 1, wherein, in the step of anchoring, the transferred energy is mechanical vibration energy.

3. The method according to claim 2, wherein, in addition to the mechanical vibration energy, a shearing force is applied to the interference fit, the shearing force acting between the first object and the second object.

4. The method according to claim 1, wherein, the insert portion is oriented within the opening with the length substantially parallel to the depth, and wherein the interference fit is established between lateral sides of the insert portion and a lateral wall of the opening.

5. The method according to claim 4, wherein the interference fit is established by forcing the insert portion into the opening with the aid of the interference force being directed substantially parallel to the length and to the depth and being applied to a proximal face of the first object.

6. The method according to claim 3, wherein the shearing force is directed substantially parallel to the length and to the depth and is applied to a proximal face of the first object.

7. The method according to claim 6, wherein, during the step of anchoring, movement of the first object and the second object relative to each other caused by the shearing force is prevented or limited.

8. The method according to claim 7, wherein said movement is prevented or limited by a distal end of the insert portion being positioned to abut a bottom of the opening, by a restriction in an opening cross section or by an auxiliary anvil positioned in the opening.

9. The method according to claim 3, wherein the interference force, the mechanical vibration energy and, if applicable, the shearing force are applied to the first object.

10. The method according to claim 1, wherein the first object is completely formed from the first material.

11. The method according to claim 1, wherein the first object further comprises a core of a further material which under the conditions of the anchoring step is not softened or liquefied.

12. The method according to claim 1, wherein the lateral sides of the insert portion comprise energy directing structures in the form of ridges extending substantially parallel to the length.

13. The method according to claim 4, wherein the opening and the insert portion are substantially cylindrical or conical.

14. The method according to claim 1, wherein the second material is solid during the steps of establishing the interference fit and of anchoring.

15. The method according to claim 14, wherein the second material is one of fibrous, porous, comprising penetrable surface structures.

16. The method according to claim 14, wherein the second material is one of chipboard, fibre board, wood, plywood and cardboard.

17. The method according to claim 1, wherein the first material comprises a thermoplastic polymer with an elasticity coefficient of at least 0.5 GPa.

18. The method according to claim 17, wherein the first material further comprises a filler.

19. The method according to claim 1, wherein cross sections of the insert portion and of the opening are adapted to each other by not having a same shape so that the interference fit is limited to only parts of the circumference of the cross sections.

20. The method according to claim 1, wherein cross section pairing of the insert portion and the opening differs along the depth of the opening such that the interference fit is restricted to predetermined areas along the depth.

21. The method according to claim 20, wherein the interference fit is restricted to areas that do not extend to a mouth of the opening.

22. The method according to claim 1, wherein the insert portion comprises an interior opening accessible from a proximal side of the first object, wherein the step of establishing the interference fit comprises the sub-steps of placing the insert portion relative to the opening and of thereafter inserting an expansion element in the interior opening to cause an expansion of the insert portion within the opening for establishing the interference fit.

* * * * *